Mar. 20, 1923. 1,449,275.
C. M. FEIST.
HOLDER FOR BOTTLES OR CONTAINERS.
FILED MAY 5, 1922. 2 SHEETS—SHEET 1.
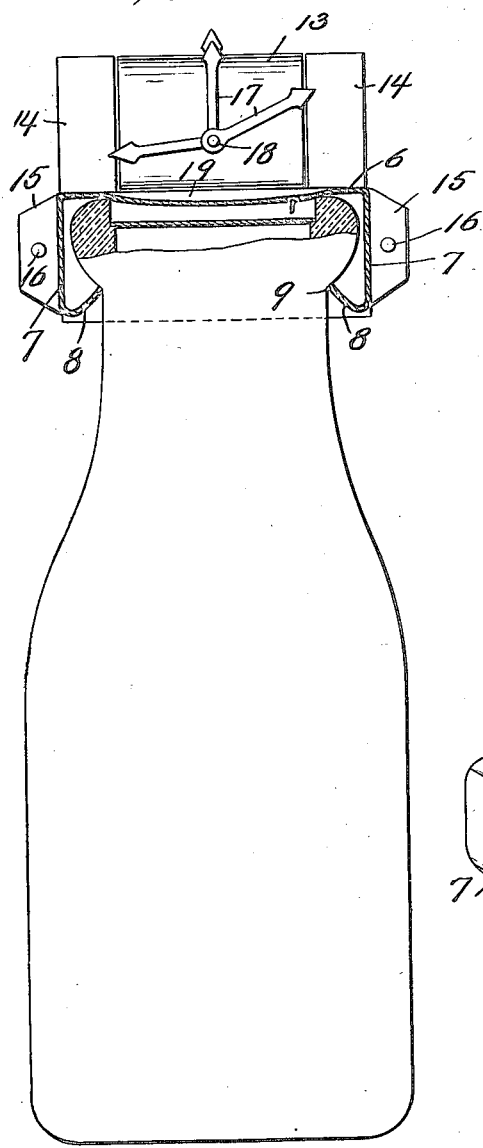
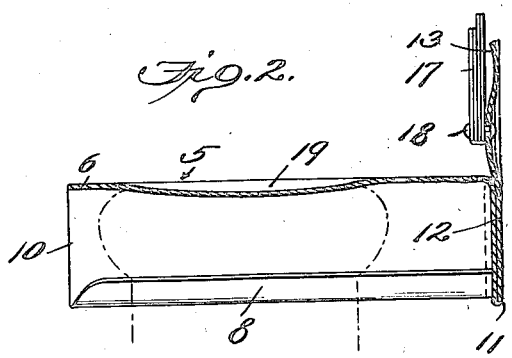
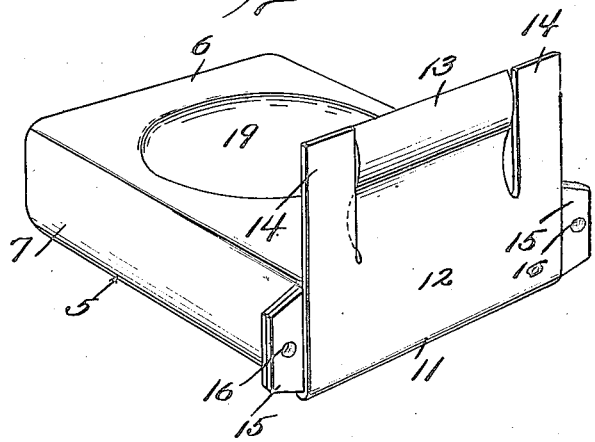
Inventor
Charles M. Feist
By James L. Norris,
Attorney

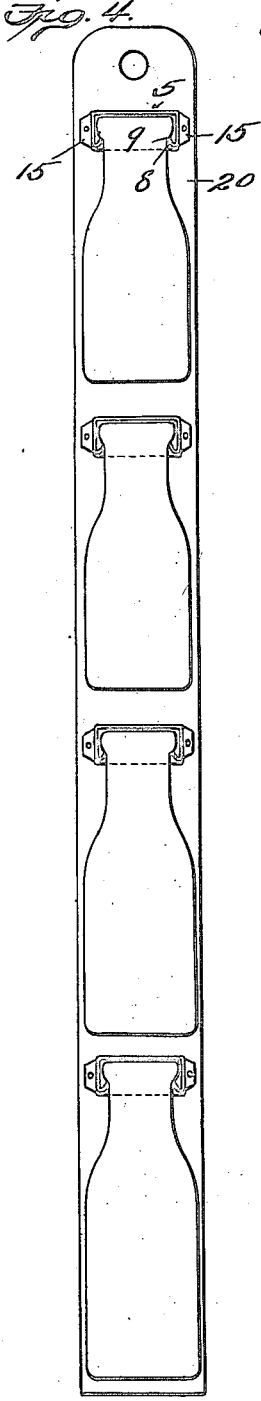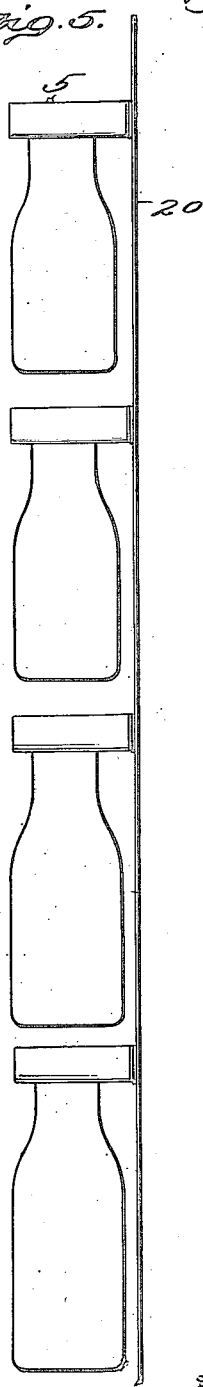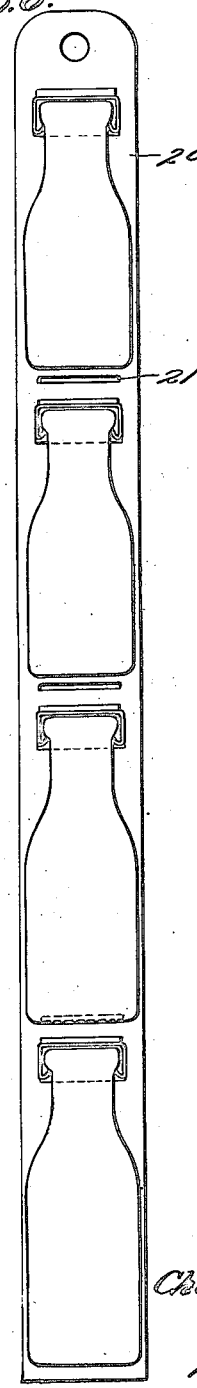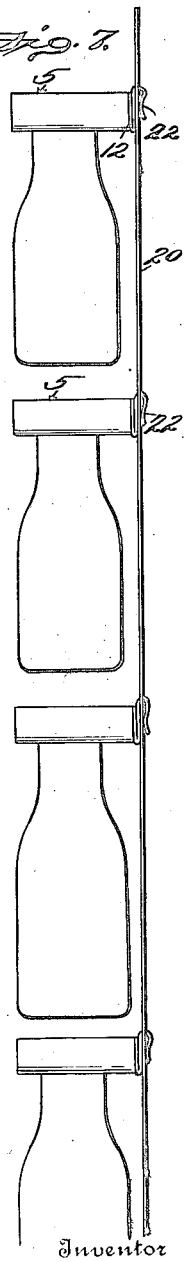

Patented Mar. 20, 1923.                                                                 1,449,275

UNITED STATES PATENT OFFICE.

CHARLES M. FEIST, OF SIOUX CITY, IOWA.

HOLDER FOR BOTTLES OR CONTAINERS.

Original application filed December 6, 1921, Serial No. 520,434. Divided and this application filed May 5, 1922. Serial No. 558,611.

*To all whom it may concern:*

Be it known that I, CHARLES M. FEIST, a citizen of the United States, residing at Sioux City, in the county of Woodbury and State of Iowa, have invented new and useful Improvements in Holders for Bottles or Containers, of which the following is a specification.

This invention relates to a bottle and can holder particularly adapted for holding milk bottles or analogous containers. The primary object of the invention is to provide a holder having frictional means to engage different parts of the upper extremity of a milk bottle, jar, or other container, and hold the latter against loose engagement and avoid accidental displacement. A further object of the invention is to provide a holder of the class specified constructed of sheet metal wherein the parts of the metal blank when bent into shape are utilized as means for engaging the upper end of the milk bottle or other container without requiring the addition thereto of separate pieces, and whereby an economical holding device for a milk bottle or other container is produced at a comparatively small cost. A still further object of the invention is to provide a holder of the class specified having means for positively holding and suspending a milk bottle or other container in an elevated position and within easy reaching distance, and in some instances, to use a plurality of the improved holders arranged in vertical alinement to receive bottles or jars for temporary storage purposes.

The subject-matter of this application constitutes a division of my original application Serial No. 520,434, filed December 6, 1921, relating to Combined holders, indicating and advertising means.

In the drawings:

Fig. 1 is a transverse vertical section through the improved holder, showing a milk bottle applied thereto and the upper neck rim of the latter broken away and in section;

Fig. 2 is a longitudinal vertical section through the improved holder, showing a portion of a bottle in position therein in dotted lines;

Fig. 3 is a detail perspective view of the improved holder;

Figs. 4 and 5 are, respectively, front and side elevations of supporting means for a plurality of the holders disclosed by Figs. 1, 2 and 3; and Figs 6 and 7 are, respectively, front and side elevations showing a slightly modified structure for arranging the improved holders in vertical alinement.

The numeral 5 designates the body of the holder which has a closed top 6 and opposite closed sides 7 with their lower terminals bent inwardly and upwardly preferably in curved contour to form retaining flanges 8 and to provide an open bottom 9. The front 10 of the holders is fully open, as shown by Fig. 2, and the material of which the holder is formed is continued and rebent at the rear, as at 11, to provide an upstanding clip 12 comprising an intermediate tongue 13 and opposite side guards 14, which latter structure is fully covered in my pending application above noted. The rear end of the holder is also formed with outstanding right angular ears 15 with openings 16 therein to serve as means for attaching the holder at any suitable elevation on a door frame or other supporting means adjacent to a door and on the outside of the latter, or at any point within a room or other enclosure where it may be desired to apply the improved device for general service. On the face of the tongue 13 are a plurality of index hands 17 which are secured by a pivot device 18 of any suitable form. The closed top 6 of the holder is dished or concaved, as at 19, to form a tray or receptacle for holding coins or tickets, the tray also serving, in view of its dependence above the horizontal surface of the top 6, as a part of the retaining means for the bottle or container when the latter is inserted in the holder in a manner which will be presently explained.

As hereinbefore specified, the improved holder may be secured by any suitable means without departing from the spirit of the invention as originally disclosed in my pending application aforesaid, and as an illustration of this obvious change in structure and an extension of the utility of the improved holder, Figs. 4, 5, 6 and 7 show the ears 15 secured to an upright support 20 that may be applied to a wall or other suitable support. The several holders as shown by Figs. 4 and 5 are fixed to the support, but as shown by Figs. 6 and 7, the support 20 has formed therein a plurality of slots 21 to removably receive a rear hook 22 which is provided by bending the clip 12 hereinbefore described downwardly to engage one of the slots 21 and provide for positioning the holder at various elevations, and whereby bottles, jars or other containers of different lengths may be supported in convenient positions and be readily accessible. The use of the supports 20 as shown by Figs. 4, 5, 6 and 7 in nowise modifies the construction of the improved holder in the essential features of the latter as far as the present divisional application is concerned, as the holder features alone constitute the subject-matter of this application and the index and advertising features have been retained in my original application as above specified.

The improved holder may have an empty bottle inserted therein, to be replaced by a full bottle, as understood in the present practice of exchanging bottles, or a filled bottle, jar or other container may be applied to the improved holder and remain in engagement with the latter for a period longer than is the case when the holder is used for suspending milk bottles. Whatever the kind of bottle, jar or other container that may be applied to the holder, the flanges 8 by their upward projection and curvature frictionally bind against opposite portions of the upper extremity of the bottle, jar or other container and the dimensions are such that the tray 19 will set up a frictional binding action on the mouth or upper inlet end of the bottle or jar, and thereby retain the bottle or jar with positive firmness within the body of the holder. To accomplish this frictional engagement and positive retention of a bottle or jar by the holder, it will be understood that the holder body will be preferably formed of sheet metal of suitable thickness having a certain amount of inherent resiliency, but at the same time stiff enough to render the holder strong and durable in its service.

What is claimed as new is:

1. A device of the class specified, consisting of a receiver having a closed top and sides and an open bottom and front end, the lower portions of the sides being bent inwardly and upwardly to provide projecting resilient flanges for gripping a device inserted in the holder, the closed top being formed with a depressed tray which also serves as an upper engaging means for the top of the device inserted in the holder.

2. In a device of the class specified, a receiver composed of sheet metal having sides provided with bottle-holding means and also formed with a fully open front and a closed top, the closed top having a depression therein to form a tray to receive coin or a ticket and also to fit in and closely engage the top of a bottle inserted between the sides below the said closed top.

3. A device of the class specified consisting of a receiver having a closed top and sides and an open bottom and front end, the lower edges of the sides being bent inwardly and upwardly to form projecting resilient flanges and to dispose the inner edges of said flanges at such inward angles as to squarely bear against the lower portion of the bottle bead, the flanges being curved to give them a more effective gripping action relatively to the bottle inserted therebetween.

4. A device of the class specified, consisting of a receiver having a closed top and sides and an open bottom and front end, the lower portions of the sides being bent inwardly and upwardly to form projecting resilient flanges for gripping a device inserted in the receiver between the said flanges, the closed top of the receiver also being formed with a depressed tray for service as an engaging means for the top of the device inserted in the receiver and also as a means for holding a coin or ticket.

5. A device of the class specified, consisting of a receiver having a closed top and sides and an open bottom and front end, the receiver having a closed rear end provided with attaching means, the lower portions of the sides being bent inwardly and upwardly in converging relation to form projecting resilient flanges for gripping a device inserted in the holder, and a supporting device to which a plurality of the holders are applied in vertical alinement.

6. A device of the class specified, comprising an elongated supporting strip adapted to be suspended from a suitable holding means therefor, and a plurality of receivers attached to the strip and disposed in vertical alinement on the latter, each receiver having a closed top and sides and an open bottom and front end and the lower portions of the sides bent inwardly and upwardly to provide projecting resilient flanges, whereby a plurality of containing devices may be removably applied at their upper ends to the receivers and held suspended by the latter with relation to the strip.

7. In a device of the class specified, an elongated bottle or jar-holding strip having means at the upper end for suspending the same from a suitable support, the said strip being provided with receiving devices disposed thereon in vertical alinement at regular distances apart, each receiving device having a closed top and a rear closed end and an open bottom and front end, each receiving device also having sides with lower inwardly and upwardly inturned resilient portions between which and the closed top the top of a containing device may be removably secured to suspend the containing device.

In testimony whereof I have hereunto set my hand in presence of two subscribing witnesses.

CHARLES M. FEIST.

Witnesses:
  M. L. SLOAN,
  R. D. HALLAND.